(12) United States Patent
Alhanbali, Sr.

(10) Patent No.: US 11,034,284 B2
(45) Date of Patent: Jun. 15, 2021

(54) NAVIGATIONAL DEVICE

(71) Applicant: Othman Abdulrahim Radi Alhanbali, Sr., Sydney (AU)

(72) Inventor: Othman Abdulrahim Radi Alhanbali, Sr., Sydney (AU)

( * ) Notice: Subject to any disclaimer, the term of this patent is extended or adjusted under 35 U.S.C. 154(b) by 0 days.

(21) Appl. No.: 16/205,298

(22) Filed: Nov. 30, 2018

(65) Prior Publication Data
US 2020/0262332 A1 Aug. 20, 2020

(30) Foreign Application Priority Data

Mar. 6, 2018 (AU) ................................ 2018201611
Mar. 21, 2018 (GB) ..................................... 1804464

(51) Int. Cl.
| | |
|---|---|
| *B60Q 1/08* | (2006.01) |
| *F21S 43/00* | (2018.01) |
| *F21S 41/657* | (2018.01) |
| *B60K 35/00* | (2006.01) |
| *B60Q 1/04* | (2006.01) |
| *G01C 21/36* | (2006.01) |
| *G06K 9/00* | (2006.01) |
| *B60R 11/00* | (2006.01) |

(52) U.S. Cl.
CPC ............. *B60Q 1/085* (2013.01); *B60K 35/00* (2013.01); *B60Q 1/0483* (2013.01); *F21S 41/657* (2018.01); *F21S 43/00* (2018.01); *G01C 21/3626* (2013.01); *G06K 9/00798* (2013.01); *B60K 2370/152* (2019.05); *B60K 2370/166* (2019.05); *B60R 11/00* (2013.01); *B60R 2011/0005* (2013.01); *B60R 2011/0026* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,818,640 A | * | 10/1998 | Watanabe | G02B 5/128 359/515 |
| 6,293,686 B1 | * | 9/2001 | Hayami | B60Q 1/085 307/10.8 |
| 6,480,148 B1 | | 11/2002 | Wilson et al. | |

(Continued)

FOREIGN PATENT DOCUMENTS

| | | |
|---|---|---|
| CN | 106476678 | 3/2017 |
| DE | 102010010314 | 9/2011 |

(Continued)

*Primary Examiner* — Shelley Chen
(74) *Attorney, Agent, or Firm* — Diederiks & Whitelaw, PLC.

(57) ABSTRACT

There is provided herein a navigational device for augmenting navigational instructions. The navigational device comprises a high intensity light source that points out/indicates navigational landmarks along a route in advance of the vehicle, such as signposts, offramps and the like such that the driver need not take eyes off the road. The navigational device may comprise a gimbal for the directional control of the high-intensity light source which may control the direction of the high-intensity light source for various navigational waypoint instructions along a route. The navigational device may employ text recognition of various road signs so as to control the respective direction of the high-intensity light source.

20 Claims, 8 Drawing Sheets

(56) References Cited

U.S. PATENT DOCUMENTS

| | | | |
|---|---|---|---|
| 10,207,631 B2* | 2/2019 | Kim | B60Q 1/085 |
| 2005/0052881 A1* | 3/2005 | Hamada | B60Q 1/2607 |
| | | | 362/540 |
| 2010/0188864 A1 | 7/2010 | Raghunathan et al. | |
| 2012/0092882 A1* | 4/2012 | Schmack | B60Q 1/02 |
| | | | 362/507 |
| 2013/0250599 A1* | 9/2013 | Owada | F21S 41/143 |
| | | | 362/520 |
| 2015/0203023 A1* | 7/2015 | Marti | B60Q 1/503 |
| | | | 340/425.5 |
| 2017/0278439 A1* | 9/2017 | Wang | G09F 13/18 |
| 2017/0361759 A1* | 12/2017 | Kim | G01C 21/365 |
| 2019/0003675 A1* | 1/2019 | Kuwata | F21S 41/322 |

FOREIGN PATENT DOCUMENTS

| | | |
|---|---|---|
| DE | 102011081396 | 2/2013 |
| JP | 2006327380 | 12/2006 |
| JP | 2012247369 | 12/2012 |
| KR | 20120014705 | 2/2012 |
| KR | 20140047964 | 4/2014 |

* cited by examiner

NAVIGATIONAL DEVICE

FIELD OF THE INVENTION

This invention relates generally to navigational aids. More particularly, but not necessarily, this invention relates to vehicular dashboard mounted navigational devices.

BACKGROUND OF THE INVENTION

Dashboard mounted vehicular navigational devices comprise GPS receivers and interactive digital displays for driver navigational guidance.

However, conventional devices are distracting in that the user is required to periodically glance at the screen for navigational instructions. Some devices have text-to-speech functionality for audible guidance.

Furthermore, conventional GPS receiver navigational devices may sometimes loose signal, such as within high density built-up environments.

The present invention seeks to provide an improved navigational device, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein and improved navigational device which, in embodiments, may take the form of a conventional in-car navigational device except in that it comprises a directionally controlled high intensity light source (such as a laser diode) for navigational waypoint direction visual enhancement with a bright spot of light projected in front of the vehicle.

As such, as opposed to having to glance at the screen thereof as is the case with conventional navigational devices, the present improved navigational device utilises the high intensity light source to provide enhanced navigation directions ahead of the vehicle, such as by illuminating lanes, signposts and the like.

In embodiments, the present navigational device utilises GPS derived location data to guide the high intensity light source including for lateral control of the direction of the light source from side to side so as to be able to illuminate appropriate lanes with reference to the current GPS detected position of the vehicle.

However, in embodiments, the present navigational device recognises objects and/or landmarks in advance of the vehicle so as to be able to control the direction of the light source accordingly.

For example, in one embodiment, the present navigational device comprises image sensors and an image processor for processing data received therefrom for signage text recognition to control the direction of the light source accordingly, including for vertical and/or control of the direction of the light source up and down and/or side to side to illuminate recognised objects, text and the like. In this manner, the present navigational device may even operate during loss of GPS satellite data, such as within high density CBD environments, in tunnels and the like.

Furthermore, the high-intensity light source may enhance navigational direction indication during low visibility situations, such as at night, in fog, in a dust storm or the like.

In other embodiments, the present navigational device may utilise other types of sensors, such as vehicular proximity sensors for the control of the direction of the high intensity light source. In accordance with this embodiment, the navigational device may illuminate navigational waypoint instructions with reference to proximity of other vehicles.

In embodiments, as opposed to projecting a high intensity light source ahead of the vehicle, the present navigational device may employ a heads-up display wherein the beam of light is reflected from a windscreen with reference to the respective position of the driver's eyes and the landmark ahead.

In embodiments, the present navigational device may be a standalone device in that it comprises on-screen display, GPS receiver, routing software and the like. However, in other embodiments, the present device may interface with an existing navigational system, such as an existing vehicle navigational system. In embodiments, the present navigational device may be inbuilt during manufacture of the vehicle as opposed to being provided as an aftermarket accessory.

As such, the foregoing in mind, in accordance with one aspect, there is provided a navigational device comprising: a high intensity light source; a gimbal controlling the high intensity light source; a controller controlling the gimbal wherein, in use, the controller is configured for: determining a navigational instruction; determining a landmark according to the navigational instruction; and controlling the gimbal to project a beam of light ahead of the vehicle from the high intensity light source to highlight the landmark The navigational instruction may comprise at least one of a turn and a lane change.

The controller may be configured for: receiving GPS data from a GPS receiver and determining the vehicle orientation and position from the GPS data; calculating a respective position of the landmark utilising GIS data; calculating a lateral projection angle in accordance with the respective position of the landmark; vehicle orientation and position.

The navigational device may enhance the GPS data utilising differential GPS data.

The navigational device may further comprise an image sensor and wherein, in controlling the vertical projection angle, the controller may be configured for image processing image data received from the image sensor to: identify a feature of the navigational landmark within the image data; identify the relative position of the feature within the image data; and calculate the vertical projection angle in accordance with the relative position.

The image processing may comprise text recognition and wherein the feature of the navigational landmark may be text.

The text for recognition may be obtained from the navigational instruction.

The controller may be further configured to: calculated at least one bounding edge of recognised text; and control the gimbal to highlight the at least one bounding edge of the recognised text.

The image processing may comprise object recognition.

Object recognition may comprise object colour recognition.

Object recognition may comprise object shape recognition.

The controller may be further configured for: calculating a lateral projection angle and a vertical projection angle in accordance with the relative position of the feature within the image data; and controlling the using the lateral projection angle on the vertical projection angle.

The navigational device may further comprise an orientational sensor and wherein the controller may be further configured for adjusting a projection angle in accordance with orientational data received via the orientational sensor.

The controller may be further configured for: selecting a navigational icon in accordance with a type of the navigational instruction; and controlling the gimbal to draw the navigational icon utilising the beam of light.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
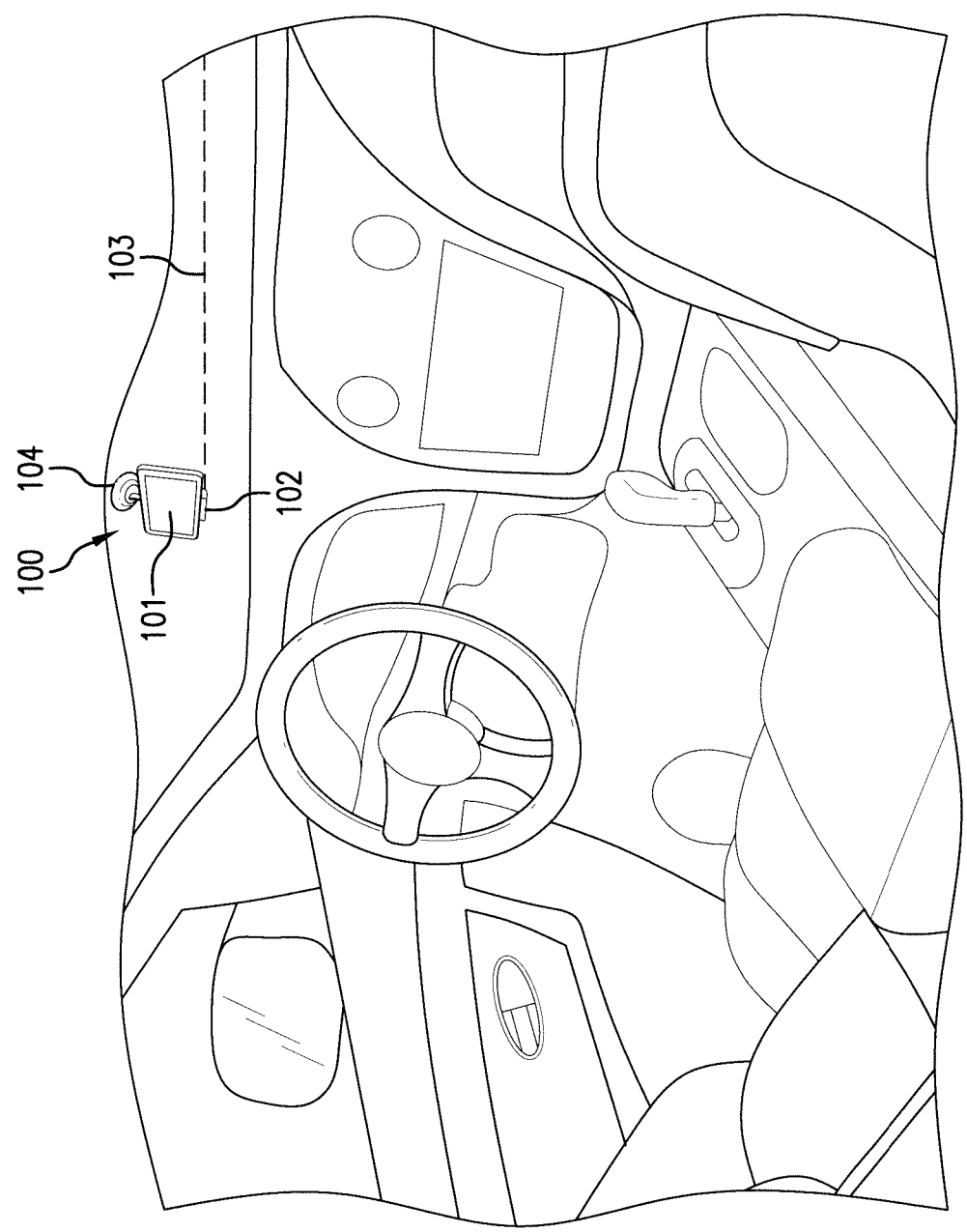
FIG. 1 shows a dashboard view have an improved navigational device adhered to a windscreen in accordance with an embodiment.

Turning to FIG. 1, there is shown an improved navigational device 100 adhered to a vehicle windscreen.

The navigational device 100 may take a conventional form in that it may comprise a small form factor body adhered to the windscreen by way of a suction mount 104 or the like. The navigational device 100 may further comprise a digital display 101 for the display of digital data which may include a haptic overlay for the receipt of user input.

However, the navigational device 100 is characterised in that it comprises a directionally controlled high intensity light source 102 configured for emitting a high intensity beam of light 103 in advance of the vehicle so as to provide enhanced navigational indications to the driver without the driver having to glance at the digital display 101.

Figure 2:
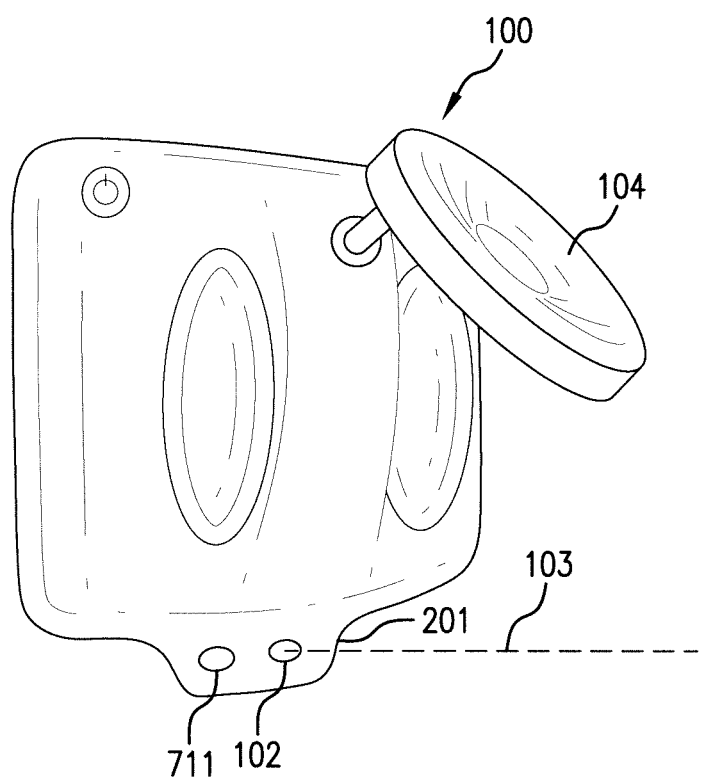
FIG. 2 shows a rear view of the improved navigational device comprising a forward projecting directionally controlled high-intensity light source.

FIG. 2 shows an exemplary rear view of the device 100 wherein, as can be seen, the directionally controlled high intensity light source 102 may be arranged to project from a rear surface of the device 100, and be located away from the suction cup 104, such as within an inferior housing 201 for a clear view of the road ahead. As such, as will be described in further detail below, as the vehicle navigates a route, the directionally controlled light source 102 controls the projection angle of the high intensity beam of light 103 to illuminate various navigationally relevant landmarks/object ahead of the vehicle.

Figure 3:
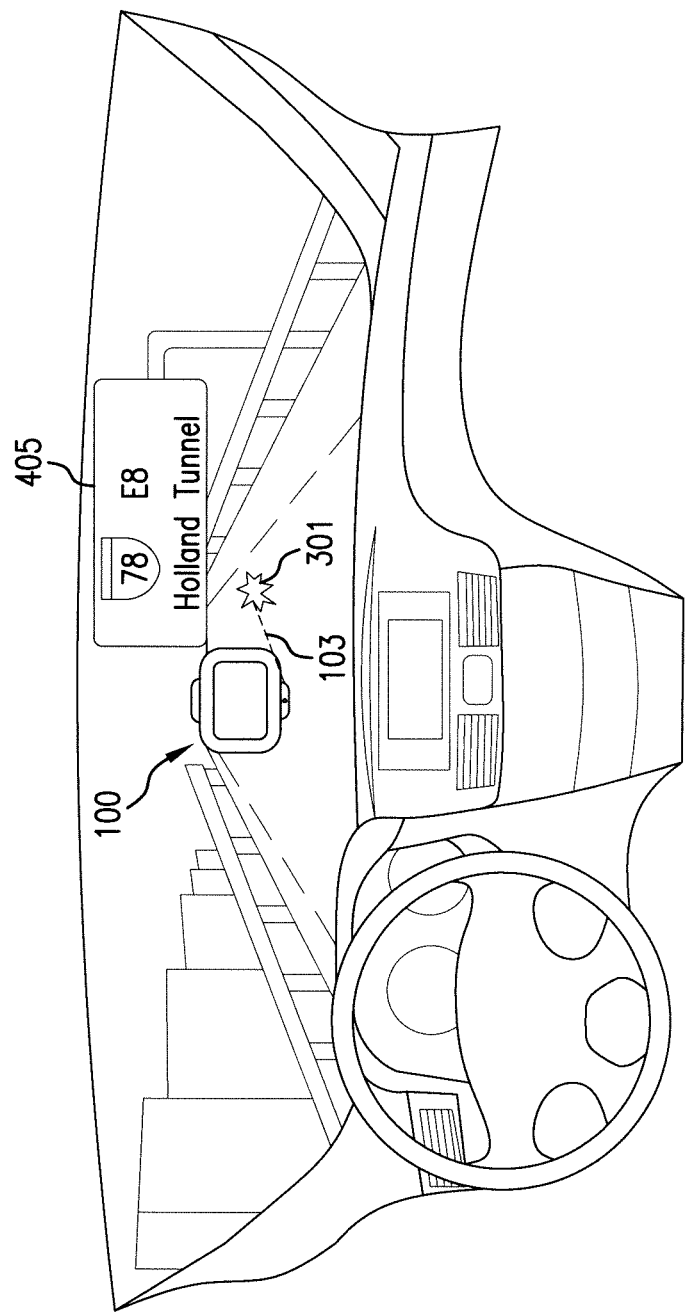
FIG. 3 shows an exemplary forward view from the dashboard wherein the improved navigational device directs a high-intensity beam of light to appropriate navigational landmarks/objects.

Specifically, FIG. 3 shows an exemplary forward view from the vehicle having the device 100 mounted to the front windscreen thereof.

As can be seen, the driver is approaching and offramp and, as such, the navigational device 100 projects the high intensity beam of light 103 to illuminate a bright spot of coloured light 301 in the direction of the offramp. As can be seen, the spot of coloured light 301 may be directed onto the road surface a suitable distance in front of the vehicle.

Figure 4:
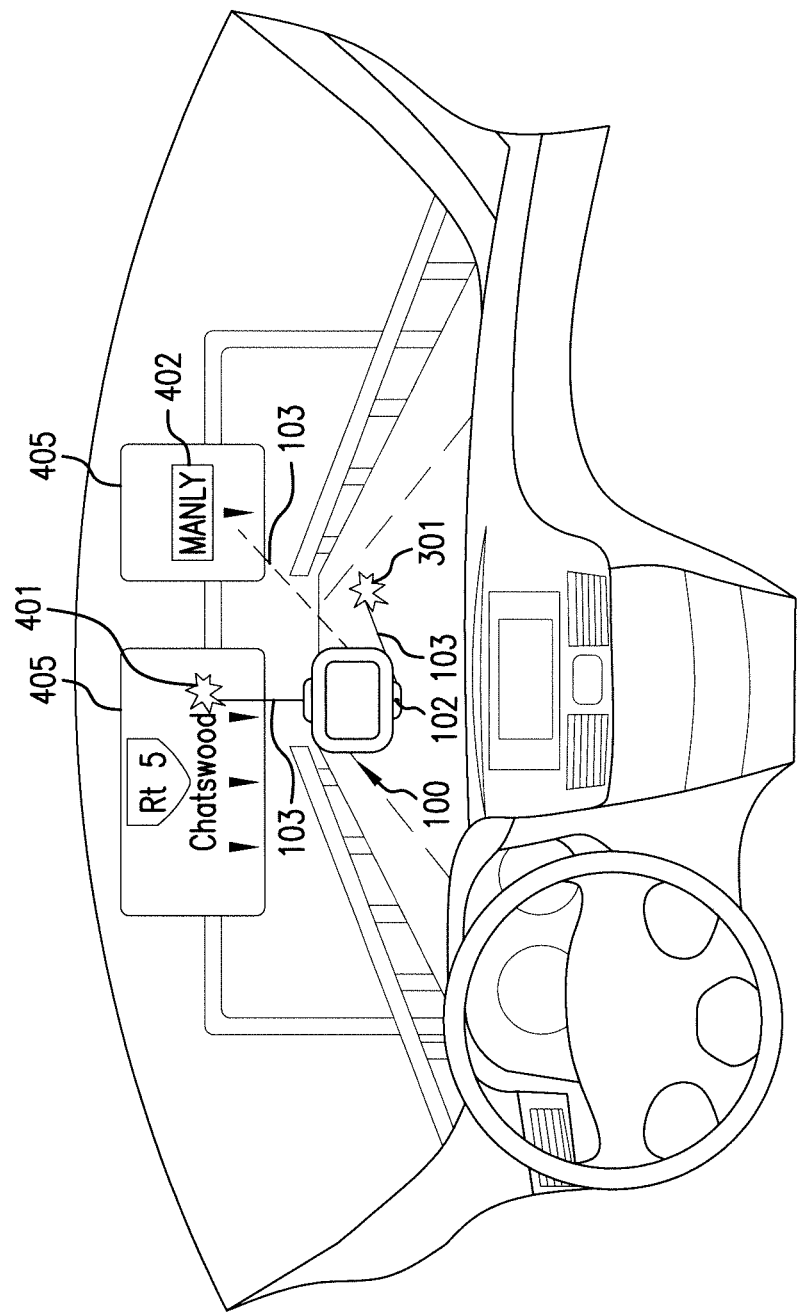
FIG. 4 illustrates differing methods of landmark illumination in accordance with embodiments.

FIG. 4 demonstrates further ways in which the high-intensity beam of light 103 may be controlled to illuminate various navigational landmarks/objects.

Specifically, as described above with reference to FIG. 3, the high-intensity beam of light 103 may display lane indications.

As such, when approaching and offramp which the vehicle is to take as is determined by the device 100, the device 100 controls the directionally controlled high-intensity light source 102 to illuminate the appropriate lane as is shown in FIG. 4. The lane indications may also direct the driver as to an appropriate driving lane including for positioning the vehicle correctly for upcoming turns. For example, in anticipation of taking a right-hand offramp, the spot of light 301 may be utilised as guidance to position the vehicle in the appropriate right-hand lane.

In embodiments, the beam of light 103 may indicate other types of landmarks/objects including road signs 405.

Specifically, in the exemplary scenario shown in FIG. 4, the road signs 405 comprise two road signs 405 having a left-hand road signs 405 indicating three lanes leading to Chatswood and a right-hand road sign 405 indicating a single lane leading to Manly. Should the present navigational route be leading the vehicle towards Chatswood, the device 100 would control the high-intensity light source 102 to direct the spot of light 301 onto the Chatswood indicative road signs 405.

In embodiments, as opposed to projecting a spot of like 401, as can be seen, the light source 102 may be controlled with reference to the text displayed on the road sign such as by, for example, to encircle, bound or otherwise highlight the appropriate wording or visual future of the signpost 405 with the bounding box 402.

Such enhanced indication 402 may be implemented utilising image recognition wherein an image processor performs text recognition to identify text so as to be able to highlight text (which text may be an offramp name, street name or the like derived from a navigational waypoint instruction/direction of the active navigational route). Furthermore, the text recognition may identify at least one edge of the text so as to be able to control the light source 102 to draw the bounding borders 402.

In embodiments, as the device 100 may also highlight informational road signs, such as an informational road sign informing the user of the distance to an upcoming turn.

In further embodiments, the device 100 may highlight regulatory road signs, such as speed limit signs. In this embodiment, the device 100 monitors the velocity of the vehicle and, should the vehicle exceed a speed limit (as which may be known to the device 100 from the location or alternatively inferred from a road sign via text ignition), the device 100 may highlight the road sign with the spot of light 301, bounding box 402 or the like to draw the driver's attention to the speed sign, including if the vehicle exceeds the speed limit. In embodiments, light of different colour may be utilised to be indicative of the vehicle exceeding the speed limit.

Figure 7:
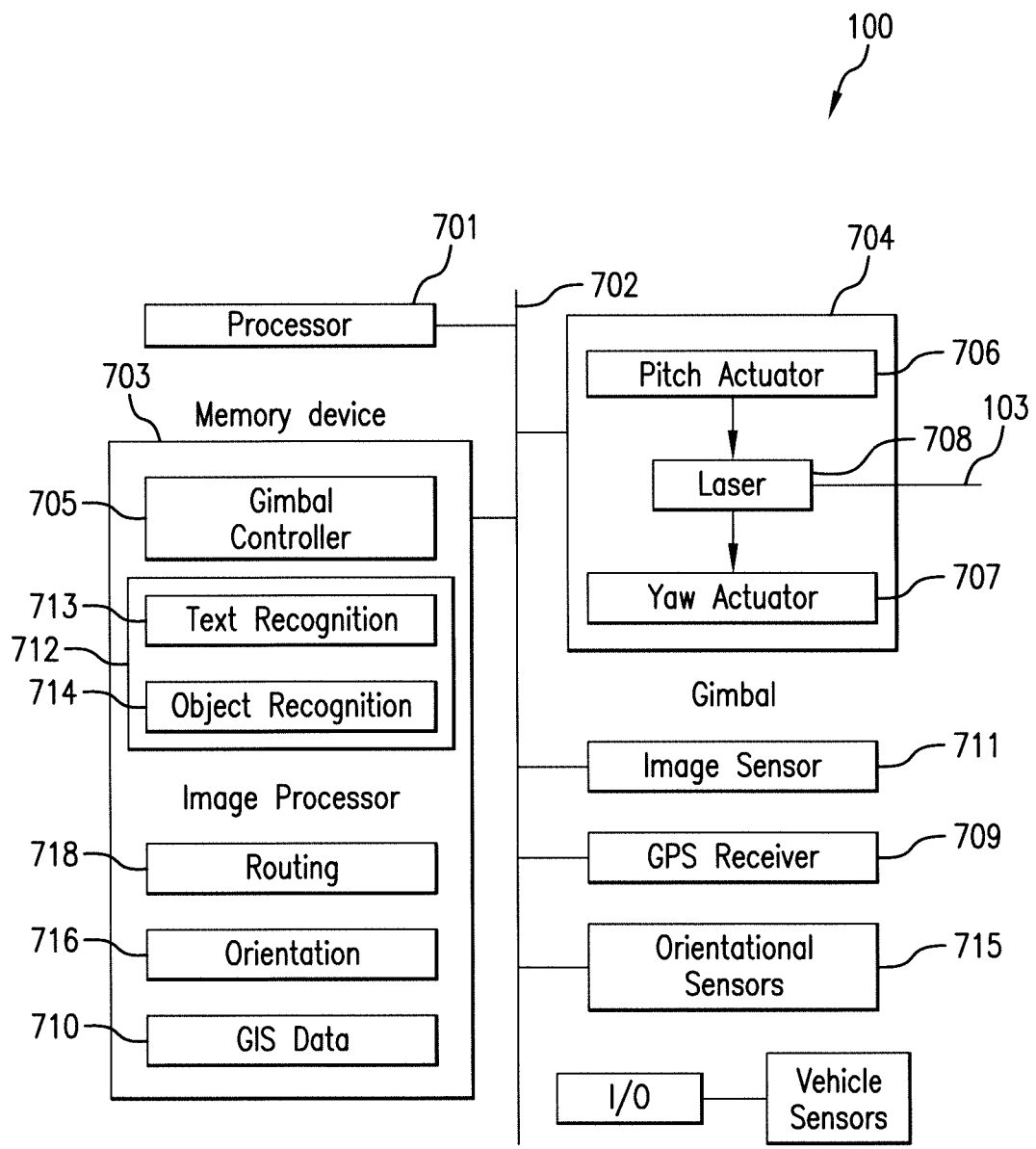
FIG. 7 shows various computer componentry of the navigational device in accordance with an embodiment.

FIG. 7 shows exemplary constituent computer componentry of the navigational device 100 in accordance with an embodiment. As can be seen, the device 100 comprises a processor 701 for processing digital data. In operable communication with the processor 701 across a system bus 702 is a memory device 703. The memory device 703 is configured for storing digital data including computer program code instructions. As such, in use, the processor 701 fetches these computer program code instructions from the memory device 703 for interpretation and execution.

The computer program code instructions of the memory device 703 are illustrated as having been divided into various functional controller modules as will be described in further detail below.

The device 100 comprises a gimbal 704 in operable communication with the processor 701. In this regard, the memory device 703 may comprise a gimbal controller 705 for controlling the gimbal 704.

As can be seen, the gimbal 704 may comprise a pitch actuator 706 for controlling the vertical projection angle of the beam of light 103 and, furthermore, yaw actuator 707 for controlling the lateral projection of the beam of light 103.

There is shown the pitch and yaw actuators 706, 707 controlling the high-intensity light source which, in the embodiment shown is a laser emitter 708. The laser emitter 708 may comprises a laser diode emitting a very narrow coherent low-power laser beam a visible light intended to highlight the navigational landmark with a bright spot of coloured light of red, green or the like. Typically, the laser emitter 708 power does not exceed 5 mW.

The memory device 703 may further comprise a routing controller 718 configured for controlling aspects of navigational routing, such as route calculation and the like and generating navigational waypoint directions along the active route. In this regard, the device 100 may further comprise a GPS receiver 709 for receipt of GPS data from a plurality of GPS satellites for determining a location of the navigational device 100.

As such, utilising GPS data received via the GPS receiver 709, the routing controller 718 is configured for calculating routes, issuing navigational waypoint instructions/directions, determining the position and direction of the vehicle and the like.

Furthermore, the memory device 703 may comprise GIS data 710 which may either be stored within the memory device 703 or retrieved on demand across the mobile data network. The GIS data 710 may comprise positions of various navigational landmarks/objects.

Figure 6:
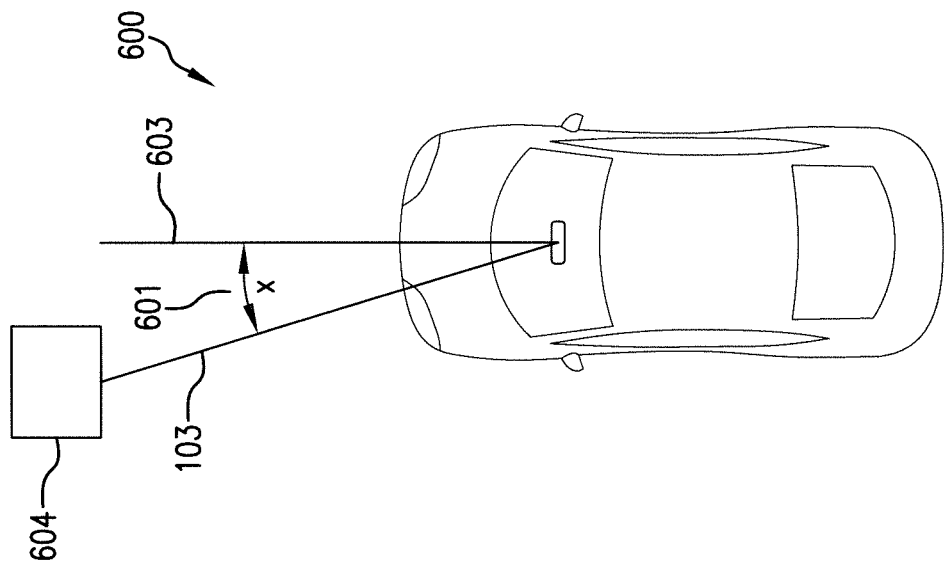
Figure 5:
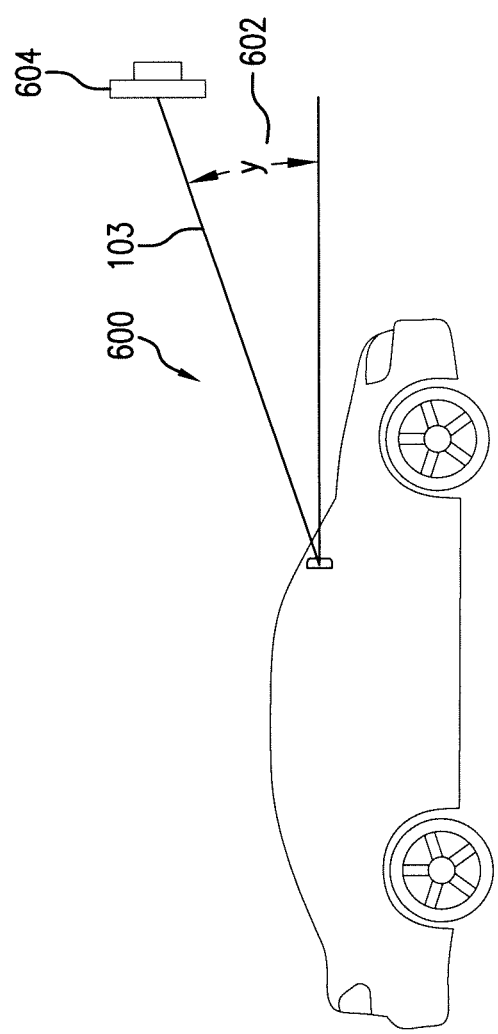
FIG. 5 illustrates the vertical offset control of the projected beam of light and FIG. 6 corresponding shows the lateral offset control of the projected beam of light in accordance with an embodiment.

FIGS. 5 and 6 show the lateral and vertical control of the projection angle of the high-intensity light source 708.

Specifically, FIG. 6 shows the control of the lateral projection angle 601 of the light beam 103 from the high-intensity light source 708 from side to side by the yaw controller 707 to highlight laterally offset landmarks 604. FIG. 5 correspondingly shows the control of the vertical projection angle 602 of the light beam 103 up and down to highlight vertically offset landmarks 604.

The navigational device 100 may control one or both of the lateral projection angle 601 and the vertical projection angle 602.

The lateral projection angle 601 may be utilised for illuminating landmarks such as lanes. In accordance with this embodiment, the routing controller 718 may determine a position and travel direction 603 of the vehicle 600 using GPS data received via the GPS receiver 709.

Furthermore, the routing controller 718 may retrieve positions of various navigational landmarks, such as lanes, interchanges and the like from the GIS data 710.

As such, the controller 705 may be configured for calculating the lateral projection angle 601 of the laterally offset landmark 604 with reference to the position and direction of travel 603 of the vehicle 600 so as to be able to control the yaw actuator 707 accordingly.

In embodiments, the location of the device 100 as is determined by the GPS receiver 709 may be sufficiently accurate so as to be able to provide such lateral indications with relative accuracy. In embodiments, the device 104 may enhance selective availability GPS data utilising differential GPS data received via a mobile data network.

However, in embodiments, the calculation of the lateral projection angle 601 may be calculated and/or enhanced utilising image processing. In this regard, the vertical projection angle 602 may also be calculated in accordance with image processing.

Specifically, as can be seen, the device 100 may further comprise a forward facing image sensor 711 for capturing image data of the route ahead.

Image data received from the image sensor 711 is processed by an image processor 712.

The Image processor 712 may be configured for identifying a feature of the navigational landmark 604 so as to be able to identify the relative position of the feature within the image data so as to be able to calculate the lateral and/or vertical projection angle in accordance with the relative position.

Specifically, with reference to FIG. 3, the current navigational route may dictate that the vehicle is to take the "Holland Tunnel". As such, at a known location of the offramp to the Holland tunnel as may be determined via the GIS data 710, the image processor 712 may capture various image frames from the image sensor 711 and perform text recognition thereon. As can be seen from FIG. 7, the image processor 712 may comprise a text recognition module.

As such, as the user approaches the roadside landmark 405, the image processor is able to identify the text "Holland" or "Holland tunnel".

The image processor 712 further calculates the position of the recognised text within the image frame of the captured image data so as to be able to identify lateral and/or vertical offsets.

For example, for the example shown in FIG. 3, the image processor 712 may determine that the text appears a lateral offset of 10° and the vertical offset of 15°.

As such, the gimbal controller 705 controls the pitch actuator 706 to pitch the laser 708 at an angle of 50° and the yaw actuator 707 at an angle of 10° so as to direct the beam of light 103 to illuminate the text with the bright spot of light 301.

As alluded to above, in embodiments, as opposed to providing a bright spot of light 301, the symbol 707 may be controlled rapidly to encircle the appropriate text with the border 402 of light. In embodiments, the spot of light 301 of the border may be pulsated so as to draw the attention of the driver.

In embodiments, the gimbal 704 may be controlled to display various navigational icons. In this embodiment, to direct the driver to take the right-hand lane offramp as is shown in FIG. 3, the navigational icon may take the form of a right-hand arrow.

In further embodiments, the image processor 712 may perform other types of image processing alternately or additionally to text recognition. As such, as can be seen from FIG. 7, the image processor 712 may comprise an object recognition module configured for recognising landmarks.

The object recognition module 704 may recognise landmarks by shape, colour or other visual feature or a combination thereof.

For example, when approaching and offramp, the object recognition module 704 may identify and offramp sign which is generally square having a green background. As such, the object recognition module 704 is configured for identifying such a landmark by shape and colour so as to be able to allow the gimbal controller 705 to illuminate the sign utilising the gimbal 704.

In embodiments, the device 100 may be calibrated by the user wherein, during a calibration stage, the laser 708 is illuminated. The user is then directed to utilise on-screen controls to control the beam of light 103 to be directly ahead.

However, in embodiments, the device 100 may comprise an orientation controller 716 for dynamic adjustment of the projection angles in accordance with the current orientation of the device 100 with reference to orientational data received from one or more orientation sensor 715.

Such orientational sensors 715 may take the form of magnetometers for determining orientation of the device 100 with reference to magnetic North and/or one or more electronic gyroscopic sensors for calculating the orientation of the device 100 with reference to 3 axes or rotation.

As such, the device 100 is able to take into account variations in the orientation of the vehicle or mounting of the device 100 to adjust the lateral and vertical projection angles of the beam of light 103.

Furthermore, the magnetometer orientational sensor 715 may be useful for situations wherein GPS signal is lost, such as within high density CBD environments wherein the routing controller 718 may not be able to accurately infer the travel direction of the vehicle 600 from GPS data received via the GPS receiver 709.

Additionally, the gyroscopic orientational sensor 715 may be useful for embodiments where the device 100 is handheld wherein the device 100 may infer the orientation from the orientational sensor 715 so as to be able to adjust the lateral and vertical projection angles 601, 602 of the beam of light 103.

For example, when arriving at the destination, the driver may decouple the device 100 from the windscreen and walk the final way to the destination, such as the house door or the like. When doing so, the device 100 would determine the present orientation of the device 100 in substantial real-time so as to be able to control the beam of light 708 to illuminate the house door utilising the beam of light 103.

Additionally, or alternatively, when walking to the front door of the house, the device 100 may perform image processing utilising the image processor 712 to, for example, identify the house number utilising the text recognition module 703 so as to be able to control the lateral and vertical projection angles 601, 602 of the beam of light 103 with reference to the respective image data position of the identified text.

In embodiments, the image processor 702 may recognise the spot of light 301 within an image frame so as to be able to calibrate the direction of the light source 708 accordingly.

Figure 8:
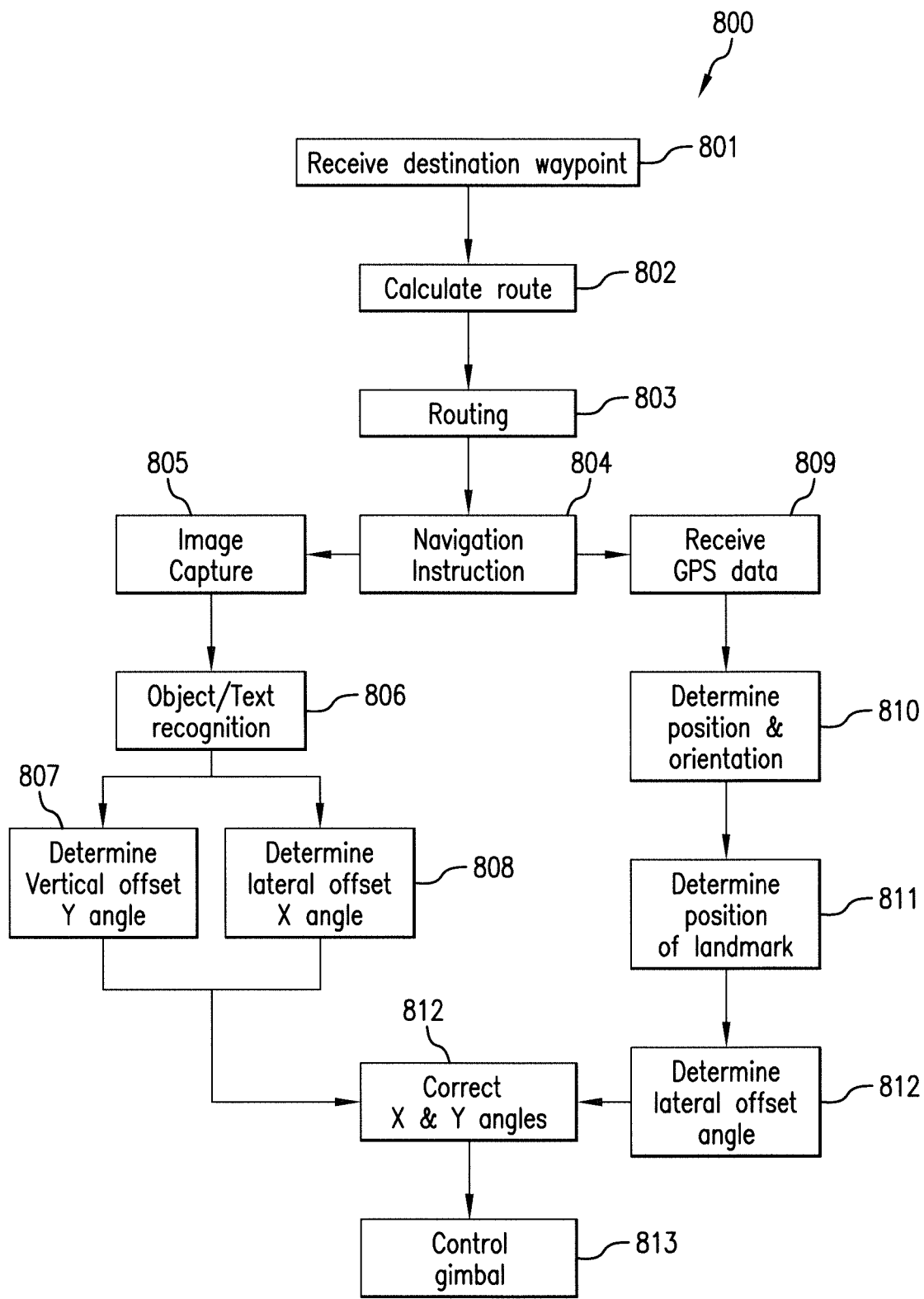
FIG. 8 shows exemplary processing by the navigational device for controlling the gimbal control high-intensity light source in accordance with an embodiment.

FIG. 8 illustrates the processing 800 for the control of the gimbal 704 by the device 100.

The processing 800 comprises the device 100 receiving a destination waypoint 801 and the routing controller 718 calculating a route at step 802 comprising a plurality of waypoints with reference to the GIS data 710.

Having calculated a route, the processing 800 comprises routing 803 wherein the device 100 guides the driver by issuing a plurality of navigation waypoint instructions/directions 704.

In one manner as is shown by the right hand fork of the processing 800 for a navigation instruction, such as a turn, lane change or the like, the device 100 receives GPS data from the GPS receiver 709.

At step 810, the routing controller 718 determines the position and orientation (i.e. travel direction) of the vehicle utilising the GPS data.

As step 811, the routing controller 700 may determine the position of a known landmark at the location utilising the GIS data 710. As alluded to above, the landmark may take the form of a lane, signpost or other appropriate landmark.

As such, at step 812, the gimbal controller 705 determines the lateral offset angle with reference to the position and orientation of the vehicle and the determined position of the landmark.

Alternatively or additionally, and with reference to the left hand fork of the processing, the device 100 may capture image data utilising the image sensor 711 at step 805.

As step 806, the device 100 employs image recognition utilising the image processor 712 to identify a feature of a landmark. As alluded to above, image recognition may employ text recognition implemented by the text recognition module 713 and/or object recognition implemented by the object recognition module 714.

Having identified a feature of the navigational landmark within the image data, the device calculates a relative position of the feature within the image data so as to be able to determine the vertical offset angle at step 807 and/or lateral offset angle at step 808.

As step 812, the device 100 may correct the projection angles utilising orientational data received via the orientational sensor 715 by recognising the spot of light 301 within an image frame in the manner described above.

At step 813, the gimbal controller 705 controls the actuator 706, 707 of the gimbal 704 to control the direction of the light beam 103 being omitted by the high-intensity light source 708. In embodiments, the device 100 may only turn on the light source 708 when required.

Figure 9:
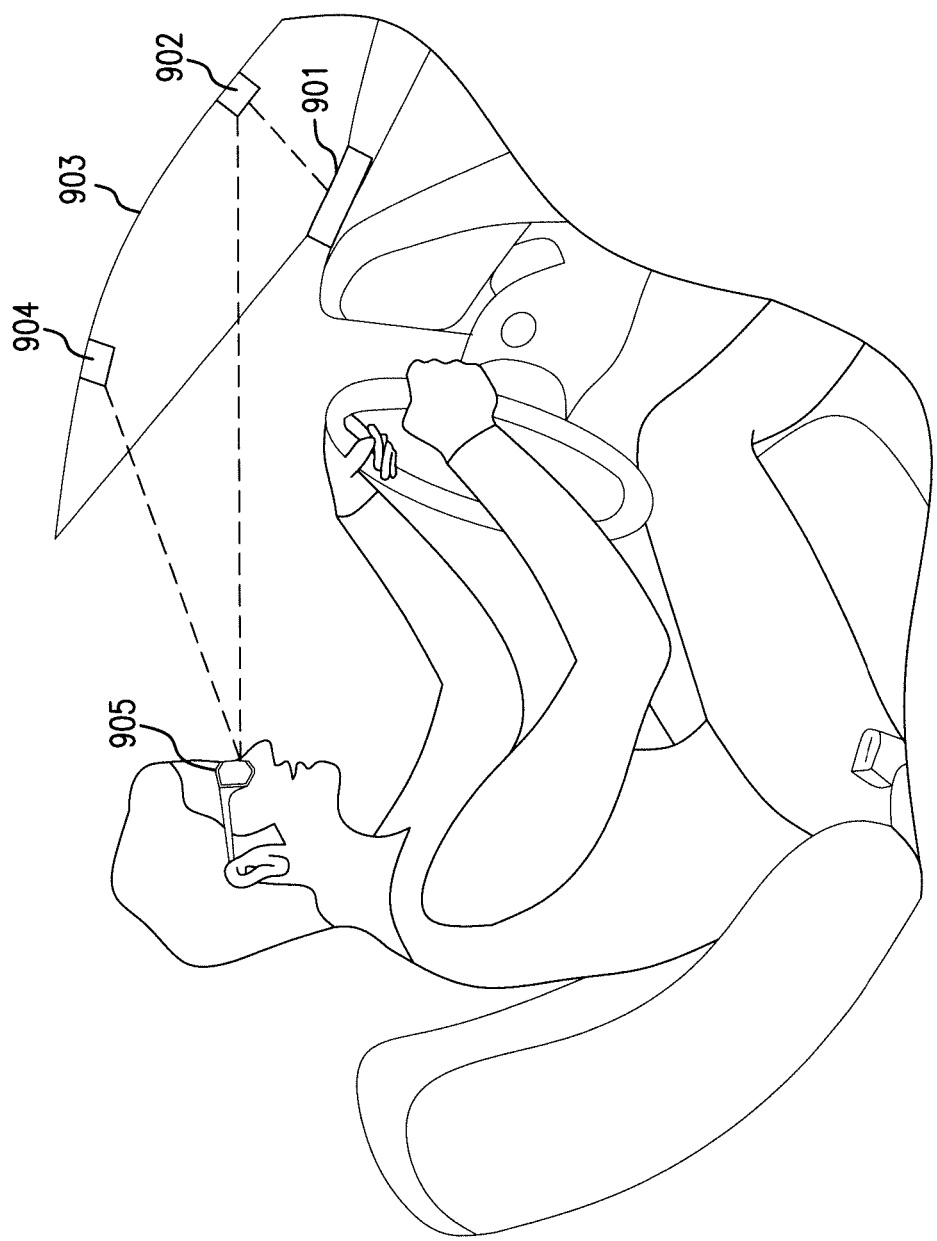
FIG. 9 shows an alternative embodiment utilising a heads up display system as opposed to a forward projecting high-intensity beam of light in accordance with an embodiment.

FIG. 9 shows an embodiment wherein, as opposed to shining a high-intensity beam of light 103 in advance of the vehicle, the device 100 rather uses a heads up display to display an apparent indication 902 reflected on the windscreen 103 from a heads up display device 101.

In accordance with this embodiment, the device 100 may employ a sensor 904 to determine the location of the eyes of the driver so as to be able to position the apparent indication 902 accordingly. In embodiments, the driver wears sunglasses 905 which may comprise distinctive visual features, such as coloured dots or the like which are recognised by the gaze sensor 904 to accurately determine the position of the eyes of the driver 905.

As alluded to above, in embodiments, the device 100 may employ other types of sensors including proximity sensor, such as ultrasonic and laser sensors to detect the presence of the vehicles within proximity of the vehicle. As such, when providing navigational enhancements utilising the spot of light 301, the device 301 may take into account respective positioning of a proximate vehicle. For example, the device 100 would not direct the vehicle into the right-hand lane should the proximity sensors determine the presence of a vehicle to the right.

In a further example, the proximity sensing may be utilised by the device 100 to identify a gap between vehicles and a lane ahead so as to direct the driver accordingly to take the gap.

The device 100 may implement such proximity sensing itself by comprising inbuilt proximity sensors. Alternatively, the device 100 may interface with the vehicle system so as to derive proximity sensor data therefrom.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A navigational device for a vehicle comprising:
    a body configured to be removably mounted to a windscreen or a dashboard;
    a directionally controlled high intensity light source housed within the body;
    an image sensor housed within the body; and
    a controller controlling at least the direction of the high intensity light source wherein, in use, the controller is configured for:
        receiving a navigational instruction;
        determining a landmark in advance of the vehicle according to the navigational instruction;
        image processing first image data received from the image sensor to identify a feature of the landmark within the first image data and identify the relative position of the feature within the first image data;
        calculating at least a vertical projection angle in accordance with the relative position; and
        controlling the direction of the light source according to the calculated vertical projection angle to project a beam of light ahead of the vehicle from the high intensity light source to at least one of:
        highlight the landmark; and
        indicate a navigational waypoint direction;
        wherein the controller is further configured for image processing second image data received from the image sensor to identify the beam of light within the second image data and calibrating the direction of the light source accordingly.

2. A navigational device as claimed in claim 1, wherein the landmark comprises at least one of a lane and a road sign.

3. A navigational device as claimed in claim 1, wherein the navigational waypoint direction comprises at least one of a turn and a lane change.

4. A navigational device as claimed in claim 1, wherein the controller is configured for:
    receiving GPS data from a GPS receiver and determining the vehicle orientation and position from the GPS data;
    calculating a respective position of the landmark utilising GIS data;
    calculating a lateral projection angle in accordance with the respective position of the landmark and vehicle orientation and position; and
    controlling the direction of the light source in accordance with the lateral projection angle.

5. A navigational device as claimed in claim 4, wherein the navigational device enhances the GPS data utilising differential GPS data.

6. A navigational device as claimed in claim 1, wherein the image processing comprises text recognition and wherein the feature of the navigational landmark is text.

7. A navigational device as claimed in claim 6, wherein the text for recognition is derived from the navigational waypoint instruction.

8. A navigational device as claimed in claim 7, wherein the controller is further configured to:
    calculate at least one bounding edge of recognised text; and
    control the light source to highlight the at least one bounding edge of the recognised text.

9. A navigational device as claimed in claim 6, wherein the image processing comprises object recognition.

10. A navigational device as claimed in claim 9, wherein object recognition comprises object colour recognition.

11. A navigational device as claimed in claim 9, wherein object recognition comprises object shape recognition.

12. A navigational device as claimed in claim 1, wherein the controller is further configured for:
    calculating a lateral projection angle in accordance with the relative position of the feature within the first image data; and
    controlling the direction of the light source using both the lateral projection angle and the vertical projection angle.

13. A navigational device as claimed in claim 12, further comprising an orientational sensor and wherein the controller is further configured for adjusting a projection angle in accordance with orientational data received via the orientational sensor.

14. A navigational device as claimed in claim 1, wherein the controller is further configured for:
    selecting a navigational icon in accordance with a type of the navigational instruction; and
    controlling the light source to display the navigational icon.

15. A navigational device as claimed in claim 13, wherein indicating a navigational waypoint direction comprises displaying the navigational icon.

16. A navigational device as claimed in claim 1, wherein indicating a navigational waypoint direction comprises illuminating a road lane.

17. A navigational device as claimed in claim 1, wherein the navigational device comprises a digital display.

18. A navigational device as claimed in claim 1, wherein highlighting the landmark comprises illuminating the landmark using the light beam projected from the light source.

19. A navigational device as claimed in claim 17, wherein illuminating the landmark comprises encircling or bounding the feature of the landmark with the light beam.

20. A navigational device as claimed in claim 18, wherein the light beam is pulsated.

* * * * *